United States Patent [19]
Broling et al.

[11] 3,865,727
[45] Feb. 11, 1975

[54] PUMPING APPARATUS WITH SEPARATING MECHANISM

[75] Inventors: Fred W. Broling, Barrington; Jeffrey A. Baker, Northbrook; Edward J. Matras, Palatine, all of Ill.

[73] Assignee: FMC Corporation, Chicago, Ill.

[22] Filed: Mar. 14, 1973

[21] Appl. No.: 341,032

[52] U.S. Cl................. 210/162, 209/283, 209/353, 210/523
[51] Int. Cl............................................. B01d 23/20
[58] Field of Search ........... 210/162, 523, 524, 525; 209/283, 358, 464, 465, 393, 353

[56] References Cited
UNITED STATES PATENTS

| | | | |
|---|---|---|---|
| 252,812 | 1/1882 | Speers................................ | 209/464 |
| 1,071,917 | 9/1913 | Hendryx.............................. | 210/524 |
| 2,491,912 | 12/1949 | Walker............................. | 210/523 X |
| 2,600,508 | 6/1952 | Lehman et al.................. | 209/393 X |

FOREIGN PATENTS OR APPLICATIONS

| 618,173 | 4/1961 | Canada............................... | 210/523 |
|---|---|---|---|

OTHER PUBLICATIONS
Wastewater Cleanup Equip., p. 333, 6/2/71, Noyes Data Corporation, Noyes Bldg., Park Ridge, N.J.

*Primary Examiner*—Theodore A. Granger
*Attorney, Agent, or Firm*—Dressler, Goldsmith, Clement & Gordon, Ltd.

[57] ABSTRACT

An apparatus for pumping and simultaneously separating the liquid and solid components from debris laden wastewater is disclosed which utilizes a screw pump to elevate the liquid and convey the liquid over a separation screen. The liquid component and a portion of the solid components flow through the screen and the balance of the solid components is discharged separately.

In a second embodiment, the wastewater is separated into its liquid-solid and solid components and the solid components are selectively sorted by passing them over additional separation screens which are of progressively larger porosity.

2 Claims, 5 Drawing Figures

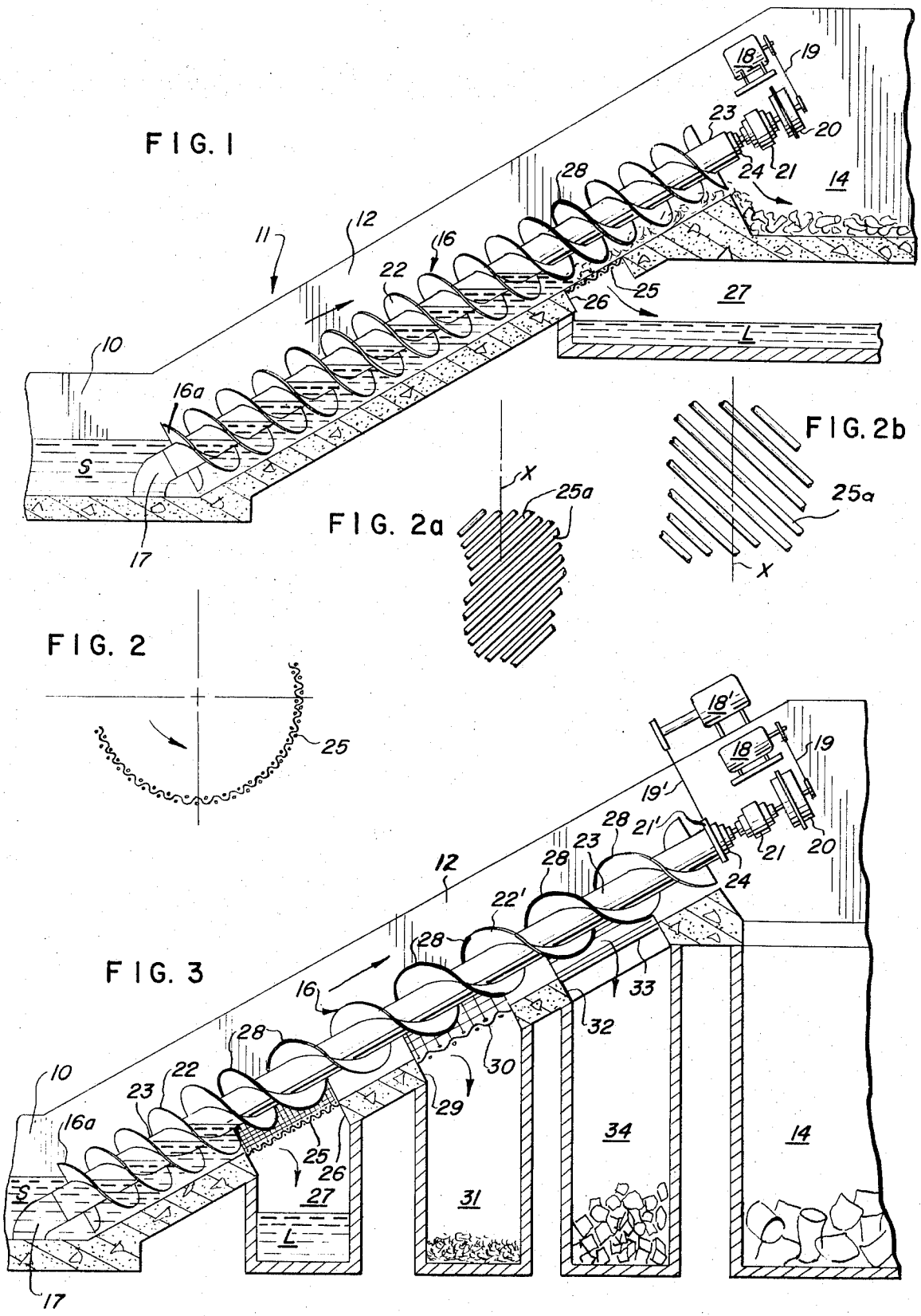

PUMPING APPARATUS WITH SEPARATING MECHANISM

BACKGROUND OF THE INVENTION

The present invention relates to the handling of wastewater or the like and more particularly to the pumping and separation of debris laden fluid.

The treatment of debris laden fluid, such as sewage, often requires the separation of the liquid component from the various larger solid components, which are carried in the liquid vehicle. These larger solid components may include rags, sticks, paper, sand and rocks, etc. The separation of the larger solid components allows for efficient and effective treatment of the liquid sewage by sanitary treatments such as clarification.

The treatment of sewage generally starts with the collection of the sewage in a reservoir or sump which receives the sewage from various arterial and trunk lines. Usually the material that is received from the arterial and trunk lines has debris such as rocks, rags and other large solids that cannot be accommodated in the main units of the treatment facility, and the larger solids are normally removed through some type of screening apparatus where the liquid passes through spaced bars and the larger solids are collected by the bars and are removed through a rake assembly.

The sewage liquid is then pumped to a higher level from where it flows by gravity into the sewage treatment facilities for further processing by various treatments known in the art. One type of pump which has proven quite efficient in the elevation of fluids from sumps into the treatment facilities is a screw pump. These pumps, sometimes referred to as Archimedes screws, provide relatively surge-free, non-clog flow at a minimum dynamic head pressure.

SUMMARY OF THE INVENTION

According to the present invention, the screening apparatus and pumping apparatus are incorporated into a common unit where the larger solids are removed while the liquid and small solids are delivered to the remainder of the facility for further processing.

In accordance with the apparatus of the present invention, a screw pump is positioned longitudinally in an inclined trough so that the intake of the screw pump is located in a reservoir wherein the debris laden wastewater is collected while the other end of the trough empties into a discharge outlet. In one embodiment of the present invention, a sieve screen is positioned in the bottom of the trough between the intake and discharge outlet so that, as the debris laden liquid is conveyed up the trough and over the screen by the screw pump, the liquid portion flows out through the screen and into an effluent chamber and thereby is separated from the remaining debris components of the sewage. The debris components then exit at the upper end of the screw pump through the discharge outlet for further disposal.

An embodiment of the present invention utilizes the Archimedes screw in combination with screens to separate various solid components from the liquid component of sewage, thereby delivering the liquid vehicle free of a portion of the debris which had been carried in the liquid.

In a second embodiment of this invention, a series of screens of progressively larger porosity are provided in the bottom area of the trough so that the first screen separates the sewage liquid from the solid components and each successive screen separates progressively larger solid components from those remaining components being conveyed by the screw pump. The solids which cannot be separated by the various screens are then exited at the discharge of the screw pump for final disposal.

In both embodiments of the invention, a common unit provides the separation of the larger solids and the elevation of the liquid thereby considerably reducing the cost of the facility.

BRIEF DESCRIPTION OF THE SEVERAL VIEWS OF THE DRAWINGS

FIG. 1 shows a side view, partially in cross section, of a screw pump and separator of the present invention;

FIG. 2 is a cross sectional view of a screen showing its orientation in the trough;

FIGS. 2a and 2b show different screen arrangements; and

FIG. 3 is a side view, partially in cross section of an embodiment of the present invention wherein the debris laden flow is progressively separated into components of various size.

DETAILED DESCRIPTION

While this invention is susceptible of embodiment in many different forms, there is shown in the drawings and will herein be described in detail a preferred embodiment and modifications of the invention, with the understanding that the present disclosure is to be considered as an exemplification of the principles of the invention and is not intended to limit the invention to the embodiments illustrated. The scope of the invention will be pointed out in the appended claims.

Referring to FIG. 1 of the drawings, there is shown an inlet sump or reservoir 10 for supplying debris laden laden liquid to a sewage treatment plant. The liquid that flows into the reservoir 10 is pumped to a higher elevation by pump means 11. Pump means 11 includes an inclined trough 12 having one end positioned in communication with the reservoir 10 and with a discharge channel or chamber 14 at the other end, for a purpose that will be described later.

Although the trough 12 illustrated in FIG. 1 is shown to be concrete, it will be appreciated that the trough may be formed from any suitable material, such as steel.

A screw pump 16 is positioned in the trough 12 so that its intake portion 16a is positioned in the reservoir by means of mounting 17. The upper end of the screw pump is supported by a journal means (not shown) and driven by motor 18 through a mechanical connection 19, reducer 20 and coupling 21. The speed reducer 20 may be driven by V-belts as indicated at 19, but it is recommended that, for larger motors, the motor be directly connected to the speed reducer through a flexible coupling.

The screw 16 consists of one or more leads of steel flighting 22 welded around a steel tube 23. One end of the tube 23 is fitted with a stub shaft 24 to accommodate driving means. These screws are generally manufactured with screw diameters ranging generally from 12 to 144 inches resulting in maximum pumping capacities between 100 to 70,000 gallons per minute.

The screw 16 and trough 12 used in the present invention are well known in the art and correspond to those made by the assignee of the present invention, Environmental Equipment Division of FMC Corporation, under the trade name Straight Line Screw Pumps.

In normal operation of a treatment plant, the pump means 11 is used to elevate the wastewater sufficiently so that it can enter by gravity flow into the treatment plant. In systems such as this, complicated screening mechanisms are used to separate debris and larger solids from the wastewater before the wastewater enters the main portion of the treatment plant. For example, the liquid is normally passed through a bar screen raking mechanism, such as shown in Miick et al. U.S. Pat. No. 1,984,891, before it enters the reservoir or sump 10. Such a mechanism is rather expensive and increases the cost of the plant.

According to the present invention, pump means 11 is designed to separate the larger solids from the remainder of the wastewater or sewage while being elevated for gravity flow into the plant. To this end the trough 12 is provided with a port 26 located at the bottom portion thereof. A screen 25 is located in the port and a channel or effluent passage 27 is positioned below the port.

As the sewage "S" is pumped up the inclined trough by the screw 16, the liquid sewage "L" passes through the screen and into the effluent passage 27 for further treatment while the large solids and materials that do not pass through the screen are discharged through the upper open end of trough 12 into chamber 14. Thus, the pump means 11 performs the second function of a solids and sewage liquid separator.

Due to the rotation of the screw 16, the liquid sewage tends to be forced up one side of the trough in the direction of rotation. The volume of fluid pumped by each flight 22 of the screw pump is influenced by the volume between flights and the frictional drag created between the flights of the screw and the liquid. Resulting in the volume of the liquid being pumped past the screen 25 to be angularly displaced in the direction of rotation. Therefore to provide for maximum separation of the solid faction being separated from the sewage, the screen 25 can be positioned at an offset angle in the direction of screw rotation from the horizontal position, as shown in FIG. 2.

The screen 25 may be formed from a variety of configurations and materials including perforated plates, woven and bar screens depending upon the type and inventory of solids contained in the sewage. For example, FIG. 2 shows the screen in cross section as being a woven screen while FIGS. 2a and 2b show fragmentary plan views of bar screens showing the different angles of orientation at which the bars may be located with respect to the screw flighting and the axis (X) of the screw 16. In FIG. 2a, the bars 25a are shown as having an angle of orientation of approximately 45° in one direction with respect to the axis (X) of screw 16 while FIG. 2b shows the bars 25a having an angle of orientation of approximately 45° in the opposite direction with respect to axis (X). Of course, the bars could extend parallel or perpendicular to axis (X) or be positioned at any other angle. The angle of orientation of the bars with respect to the axis will determine the final orientation of the bars with respect to the screw flighting.

Due to the abrasion created by debris, which may be caught in the screen 25, rubbing against the flighting 22, it has been found desirable to have the tips of the flighting 22 provided with a Neoprene tip 28 or other non conventional material in the areas contacting the screen 25. This tip provides for greater wear resistance and operability for the screw pump 16.

An alternate embodiment of the present invention may be used to selectively separate the solid components from the liquid sewage S to provide more efficient disposal or treatment thereof. The screw pump and separator illustrated in FIG. 3 not only progressively separates components but is provided with different flight pitches and/or rates of rotation to increase the effectiveness of the separator.

Since many of the parts of the embodiment shown in FIG. 3 are similar to those described above, the parts are correspondingly numbered. In the embodiment of FIG. 3, the trough has a plurality of ports, three being illustrated at 26, 29 and 32, at axially spaced locations in the bottom of the trough. The respective ports have screens 25, 30 and 33 located therein and the screens are of progressively increased porocity at increased spacings from the sump 10 and effluent channels or passages 27, 31 and 34 are located below the respective ports to receive components of the flow.

In the embodiment illustrated in FIG. 3, the flighting 22 of screw 16 is divided into first and second flight portions 22 and 22' and the pitch of flight portion 22' is greater or less than the pitch of flight portion 22, for a purpose that will be described later.

The operation of the pump and separator of FIG. 3 is similar to that described above. As the sewage S is pumped up the trough 12, the sewage liquid component L is first separated from the flow by a screen 25 of comparatively low porosity. The next screen 30 positioned in port 29 separates the smallest solids from those remaining solids in the flow and deposits them in chamber 31. Likewise, screen 33, such as a bar screen located in port 32, separates still larger diameter components from the flow and deposits them in chamber 34. Any remaining large solids are discharged out of the end of the mechanism into chamber 14.

As noted above, the screw 16 has different flight pitches 22 and 22'. It will be appreciated that flight pitch must be low enough to carry the liquid to screen 23 while the screw is rotating at a reasonable rate so that the liquid is pumped slow enough past the first screen 24 to allow the liquid L to be separated. Thus, the pitch of flights 22 is different (compared with flights 22') up to and over a sufficient portion of the screen 25 to allow for liquid L separation and also be sufficient to carry the liquid from sump 10 to port 25. The extent to which the flight 22 must extend over screen 25 depends on the speed of rotation, pitch angle, and solids inventory, but it has been found convenient to have the flights 22 extend at least a portion of the way over the first screen 25.

The different flight pitches could also be formed using separate screw sections consisting of separate concentric or axially aligned tubes 23 and 23' with different flights 22 and 22' which are driven independently, FIG. 3, by motors 18 and 18'. Motors 18 and 18' could, of course, be a single motor with separate reducers for the respective screw sections. Utilizing separate screw sections 23 and 23' has the additional advantage of being able to optimize capability of screening and pumping. It will be appreciated that the embodiment shown in FIG. 1 could also have separate screw sections with flights of different pitches.

In this embodiment of the invention, difficulties may encounter in damaging the edges of the flighting, particularly in the area of the screens because small rocks and other solids could tend to jam between the edges of the flighting and the screen. Therefore, as previously explained, it is desirable to form the flight edges in the screen area of a hardened material, such as Neoprene. In certain instances it may also be desirable to have different diameters for the different flight sections.

While the invention has been described in connection with using chambers to receive the components of flow, it will be appreciated that the term chamber is intended to cover various collecting members such as trash containers, trucks, etc. In fact in some instances it may be desirable to deposit the solids components on the ground where they can be subsequently picked up with mechanical equipment.

What is claimed is:

1. Apparatus for progressively separating the solid components and liquid component from debris laden flow comprising: a sump to receive said flow, an inclined trough to direct said flow during separation, said trough communicating with said sump at one end and having a discharge outlet at the opposite end, said trough having a plurality of axially spaced ports, screen means located in said ports to permit said components to be separated from said flow, said screen means being of progressively larger porosity at increased spacings from said sump, screw pump means for conveying said flow through said trough from the sump to the opposite end whereby said flow is conveyed over said screen means, said screw pump means having a first flight portion between said sump and a first adjacent port, and a second flight portion adjacent said discharge outlet, said second flight portion having a pitch that is greater than said first flight portion, said liquid component being separated from said flow by the first screen means while progressively larger solid components are separated from said flow at subsequent screens means, and any solid components not separated by said screen means are discharged through said discharge outlet, said screw pump including a pair of axially aligned tubes with the respective flight portions on the respective tubes and in which said tubes are rotated at different speeds.

2. Apparatus for progressively separating the solid components and liquid component from debris laden flow comprising: a sump to receive said flow, an inclined trough to direct said flow during separation, said trough communicating with said sump at one end and having a discharge outlet at the opposite end, said trough being arcuate in cross-section and having a plurality of axially spaced ports with a port adjacent said sump having opposite edges positioned at an offset angle in the direction of screw rotation from a horizontal plane extending through the axis of rotation thereof, screen means located in said ports to permit said components to be separated from said flow, said screen means being of progressively larger porosity at increased spacings from said sump, screw pump means for conveying said flow through said trough from the sump to the opposite end whereby said flow is conveyed over said screen means, said screw pump means having a first flight portion between said sump and a first adjacent port, and a second flight portion adjacent said discharge outlet, said second flight portion having a pitch that is greater than said first flight portion, said liquid component being separated from said flow by the first screen means while progressively larger solid components are separated from said flow at subsequent screen means, and any solid components not separated by said screen means are discharged through said discharge outlet.

* * * * *